United States Patent [19]

Stonier et al.

[11] Patent Number: 4,665,481
[45] Date of Patent: May 12, 1987

[54] SPEEDING UP THE RESPONSE TIME OF THE DIRECT MULTIPLEX CONTROL TRANSFER FACILITY

[75] Inventors: James W. Stonier, Chelmsford, Mass.; Thomas L. Murray, Jr., Merrimack, N.H.; Gary J. Goss, Acton; Thomas O. Holtey, Newton, both of Mass.

[73] Assignee: Honeywell Information Systems Inc., Waltham, Mass.

[21] Appl. No.: 503,962

[22] Filed: Jun. 13, 1983

[51] Int. Cl.⁴ .......................... G06F 3/00; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,633,169 | 1/1972 | Bickford | 364/200 |
| 4,032,898 | 6/1977 | Grigoletti | 364/200 |
| 4,292,668 | 9/1981 | Miller et al. | 364/200 |
| 4,293,908 | 10/1981 | Bradley et al. | 364/200 |
| 4,313,160 | 1/1982 | Kaufman et al. | 364/200 |
| 4,484,271 | 11/1984 | Miu et al. | 364/200 |

Primary Examiner—Archie E. Williams
Assistant Examiner—William G. Niessen
Attorney, Agent, or Firm—George Grayson; John S. Solakian

[57] ABSTRACT

A microprogrammed data processing system includes a central processing unit (CPU), a main memory and a number of mass storage controllers. A block of information is transferred between main memory and one of the mass storage controllers during data multiplex control (DMC) cycles. The main memory stores 2 data bytes in each word location. An input/output RAM stores channel number signals for identifying mass storage controllers. An I/O microprocessor addresses the I/O RAM to read the channel number signals onto the system bus, and a mass storage controller coupled to the system bus responds to the channel number signals to generate a read/write signal. The system responds to a request signal, the read/write signal and a signal indicative of a left or right bit of an addressed location in main memory to generate a plurality of data request signals. A read only memory is addressed in response to the data request signals to read out a plurality of microprograms for processing the data.

8 Claims, 6 Drawing Figures

IOLD

I/O INSTRUCTIONS

| DEVICE | CHANNEL NUMBER | |
|---|---|---|
| | READ | WRITE |
| FLOPPY DISK 38-2 | 0400 | 0401 |
| FLOPPY DISK 38-4 | 0480 | 0481 |
| DISK DRIVE 52-2 | 0500 | 0501 |

I/O MAIL BOX

SPEEDING UP THE RESPONSE TIME OF THE DIRECT MULTIPLEX CONTROL TRANSFER FACILITY

RELATED APPLICATIONS

The following U.S. patent application filed on an even date with the instant application and assigned to the same assignee as the instant application is related to the instant application and is incorporated herein by reference.

"Direct Multiplex Control Facility" by Thomas L. Murray, Jr., James W. Stonier, Gary J. Goss and Thomas O. Holtey, filed on June 13, 1983 and having U.S. Ser. No. 503,963.

BACKGROUND OF THE INVENTION

1. Field of the Invention

This invention generally relates to data processing systems and more specifically to the interchange of data between a mass storage controller and the main memory in such data processing systems.

2. Description of the Prior Art

A data processing system usually includes a central processing unit (CPU) which executes software instructions which are stored at addresses, or locations, in main memory. These software instructions are transferred to the CPU sequentially under the control of a program counter. The data that is processed is transferred into and out of the system by way of input/output devices, or peripheral devices such as teletypewriters, magnetic disks, magnetic tapes or line printers. Usually the data is temporarily stored in the main memory before or after the processing by the central processing unit.

In a system having a plurality of devices coupled over one or more common buses, an orderly system must be provided by which bidirectional transfer of information may be provided between such devices. This problem becomes more complicated when such devices include, for example, one or more memory units and various peripheral devices.

Various methods and apparatus are known in the prior art for interconnecting such a system. Such prior art systems range from those having common data bus paths to those which have special paths between various devices. Such systems also may include a capability for either synchronous or asynchronous operation in combination with the bus type. Some of these systems, independent of the manner in which such devices are connected or operate, require the central processor's control of any such data transfer on the bus even though, for example, the transfer may be between devices other than the central processor. In addition, these systems normally include various parity checking apparatus, priority schemes and interrupt structures. One such structural scheme is shown in U.S. Pat. No. 3,866,181. A data processing system utilizing a common asynchronous communication bus is shown in U.S. Pat. No. 3,886,524. Another in which all units in the system, including the memory, are connected in parallel is shown in U.S. Pat. No. 3,710,324. The manner in which addressing is provided in such systems as well as the manner in which, for example, any one of the devices may control the data transfer is dependent upon the implementation of the system, i.e., whether there is a common bus, whether the operation thereof is synchronous or asynchronous, etc. The system's response and throughput capability are greatly dependent on those various structures. A particular structured scheme is shown in U.S. Pat. No. 3,993,981; U.S. Pat. No. 3,995,258; U.S. Pat. No. 3,997,896; U.S. Pat. No. 4,000,485; U.S. Pat. No. 4,001,790; and U.S. Pat. No. 4,030,075 which describe an asynchronously operated common bus.

There are several ways to transfer data between a peripheral device and a main memory unit. Two popular methods are implemented by transferring data from/to the peripheral device through the CPU to/from main memory or directly from/to the peripheral device to/from the main memory.

Programmed I/O

In the first method, commonly called programmed I/O, the input/output transfer is done under the control of the software program being executed within the central processing unit. For example, to input a character from a teletypewriter peripheral, a software program executed within the CPU would be written such that it would execute one or more software instructions to first input the character entered by the teletypewriter peripheral into a register within the CPU such as the accumulator, and then a subsequent software instruction would store the contents of the accumulator into a specified main memory location. Thus, the input transfer would have taken place under software control with the data passing through the CPU. Similarly, on output the data would first be loaded from main memory into the accumulator by one software instruction and then output from the accumulator to the teletypewriter peripheral by one or more subsequent software input/output instructions. Variations of this method are known in which the software program either loops, checking the status of an indicator to determine whether the input-/output transfer has been completed between the CPU and the peripheral device, or alternatively, the completion of the transfer may be signalled by a software interrupt initiated by the peripheral device. In either case, this method is inefficient in that it requires the attention of a software program in the CPU to each individual character as it is transferred between the peripheral device and the CPU. Nevertheless, this method is often used for a low-speed peripheral device because this method usually results in the reduction in the amount of logic needed within the input/output controller to which the peripheral device is attached.

Direct Memory Transfers

Direct memory transfers, the second method, permits large quantities of data to be moved between the main memory and the peripheral device with greatly increased efficiency. Using the direct memory transfer method, the software program within the CPU initiates the transfer of a group of information and once initiated the transfer takes place between the peripheral device and the main memory without further intervention. Using this method, the software program initiates a transfer by indicating the peripheral device to which the transfer data to be input from or output to the starting address in main memory to which the data is to be transferred to or from, the number of characters or words of data to be transferred in the group or block. Then, once the transfer is initiated, the transfer takes place on a character by character, word by word basis directly between the peripheral device and the main memory unit without further software intervention.

Once the last character or word of the group has been transferred, the software in the CPU is notified either by continually checking a status indicator or upon receipt of an interrupt and the software program may then process the transferred data or initiate another transfer. This second method (direct memory transfers) is more efficient than the first method (programmed I/O) and frees the CPU for the execution of software during the time that the input/output transfer is taking place. This increase in efficiency is offset by the additional logic required within the system to hold the starting main memory address and the number of characters or words (range) of data to be transferred in the block.

There are several places within the data processing system where this added logic for direct memory transfer may be placed. For example, this added logic is often placed within the input/output controller (IOC) to which the peripheral device is attached by placing a starting address register and a range counter within the IOC. In this memory, which is commonly called Direct Memory Access (DMA), when the software initiates the transfer, the starting address is transferred from the CPU to the starting address register within the IOC and the block size (range) is also transferred to the range register within the IOC. The IOC then contains sufficient logic so that the address may be incremented by one as each word is transferred between the peripheral device and the main memory, and the range may be, for example, counted down until it reaches zero indicating the end of the group has been transferred. In addition, the IOC must contain sufficient logic to interface directly with the main memory. This interface logic in the IOC may provide the needed read/write main memory signals and may provide for the handling of exception conditions such as main memory busy, addressing a nonexistent memory location, and resolution of conflicts between the IOC and other units (the CPU or another IOC) competing for the same resource (such as the system I/O bus or main memory).

Thus, it can be seen that the logic within the IOC is increased by having to provide the address and range registers along with decrementing and incrementing logic and the main memory interface logic.

An article entitled "DMA Controller Capitalizes on Clock Cycles to Bypass CPU" by Joseph Nissim describing direct memory access can be found in the Jan., 1978, issue of Computer Design.

Data Multiplex Control

Alternatively, other direct memory transfer methods are known such as that found on Honeywell Information Systems DDP-516 computer. In this method, known as Data Multiplex Control (DMC), rather than placing the address range registers within the I/O controller, a starting address and ending address are contained in two locations within main memory which are dedicated to the particular channel to which the peripheral device is attached, there being 16 separate channels using a total of 32 locations in main memory. In addition, other logic is present within the system which is multiplexed between the 16 channels to increment the starting address as each word is transferred and to compare the incremented starting address with the ending address to see whether the last word of the group is being transferred. Using the data multiplex control method, an input/output transfer is initiated by the software for storing the starting address into the channel's main memory location and then storing the ending address into the channel's main memory location using non-I/O software instructions. After the starting and ending address main memory locations have been initiated, the program then executes one or more I/O software instructions which actually imitate the transfer of data between the peripheral device and main memory. Once initiated, each time the peripheral device determines that it requires another word of data to be sent to or from the main memory, it signals the DMC logic on a unique line associated with and dedicated to the particular channel on which the peripheral device is assigned. The DMC logic then prioritizes these transfer request signals among the one or more channels that are requesting and requests the CPU to break at the end of the current software instruction.

Once the break request is honored, at the end of the current software instruction, software execution is halted and the DMC logic takes over control of the system for four main memory cycles. During the first main memory cycle, the contents of the starting address location are fetched from main memory and stored in the address counter register of the DMC logic. The channel number corresponding to the data transfer request from the peripheral device is used to determine which main memory location contains the starting address for the particular peripheral device making the data transfer. During the second main memory cycle, the contents of the ending address location in main memory are fetched and compared with contents of the address counter register by the DMC logic. If the contents are equal, an end-of-range indicator is set and no data transfer takes place. During the third main memory cycle, the data transfer takes place between the peripheral device and main memory and is controlled by the contents of the address counter register within the DMC logic.

The direction of the transfer, whether input (from the peripheral device to main memory) or output (from main memory to the peripheral device), is determined by a bit within the main memory location containing the starting address. This bit is also transferred to the address counter register when the starting address is transferred from memory to the DMC logic. During this third main memory cycle, the contents of the address counter register are used to address the main memory with the contents of the addressed location either being read from main memory and transferred to the peripheral device or the word from the peripheral device being stored into the addressed location in main memory. During this main memory cycle, the contents of the address counter register are incremented by one. During the fourth and final main memory cycle, the contents of the address counter register are stored in the channel's starting address location within main memory. If another data transfer request is waiting, another data transfer cycle starts. If no register is waiting, the CPU resumes control and the previously halted software program resumes execution at the next software instruction.

During the first main memory cycle, the DMC logic sets a unique device address line which informs the peripheral device that the current input/output transfer is being conducted on its behalf. There are 16 device address lines, one of each of the 16 channels, and the setting of the line during the first main memory cycle is used by the peripheral device's IOC during the third main memory cycle to either place data from the peripheral device on the bus for transfer to main memory or to take data from the I/O bus, placed there by main memory, and output it to the peripheral device.

During the end of the CPU's execution of a software instruction, the DMC logic performs a synchronization cycle. During the synchronization cycle, a priority network within the data multiplex control logic determines if any channel is making a data transfer request, and if so, determines the highest priority request of the one or more channels requesting a transfer. If any peripheral connected to the DMC logic is requesting a data transfer, the DMC logic informs the CPU that a data transfer break is required.

Although this data multiplex control method of direct transfer is more efficient than the programmed control method, it has the disadvantage that four separate main memory transfer cycles are required and that the software execution is suspended during these four main memory cycles. In addition, the data transfer may only occur at the end of the software instruction thus lengthening the response to a data transfer request in the event of a software instruction which has a long execution time. Further, since there must be one data request line and one device address line per channel, this method results in the widening of the input/output bus connecting the peripherals, device controllers and the central processor and main memory by requiring two lines per available channel.

Direct Memory Access

Within the Honeywell DDP-516 computer system, the Direct Memory Access (DMA) method of direct transfer discussed above is also used for some I/O controllers. The DDP-516 DMA provides a direct, high-speed path for a peripheral device to the main memory for up to four channels. To effect a transfer, the DMA logic causes breaks between CPU cycles without regard to the end of the software instruction being processed by the CPU. The initiation and termination of the DMA cycle is controlled by the peripheral device request lines. I/O software instructions are used for loading the address and range counters of the DMA control logic and for reading the contents of the range counters. The DMA control logic contains a priority network for determining the priority of the active DMA requests from the peripheral devices and the logic for initiating and controlling the DMA cycle.

The DDP-516 DMA control logic provides the CPU with an alternate memory register and an alternate memory address register. DMA data transfers take place through the alternate memory register without disturbing the contents of the normal CPU memory register. The contents of the CPU memory address register are temporarily shuttled into the alternate memory address register and then returned upon completion of the DMA cycle. These registers give the DDP-516 DMA its cycle-stealing ability and allow it, for example, to break between the fetch and execution cycles of a software instruction.

Addresses are multiplexed into the CPU memory address register from one of four DMA channels. Each channel has a 16-bit hardware address counter which stores the starting address. The high order bit of the starting address is used to specify an input or output mode. The remaining 15 bits specify the main memory address from or to which the first DMA data transfer will take place.

In addition, each DMA channel has a 16-bit hardware range counter which stores the two's complement of the size of the block of data to be transferred. Both the address counter and the range counter are incremented each time a DMA data transfer takes place. Overflow of the range counter signifies completion of the group transfer by generating an end-of-range signal which disables the peripheral device and can be used to cause a software program interrupt. In addition, the contents of the range counter can be read into the CPU under software program control to determine, at any time, the number of words remaining to be transferred. DMA channels have their address and range information loaded under software program control by the I/O bus of the computer system. Unique I/O software instructions are provided to load each.

Peripheral devices are connected to the DMA control logic via the DMA bus. Similar to the I/O bus, the DMA bus contains 16 input lines, 16 output lines, and various control lines. Data is transferred in parallel directly to main memory from the data buffer in the peripheral device interface.

The DMA has top priority in a system and therefore takes precedence over any other operations such as a DMC data transfer request, priority interrupt processing, or real-time block incrementation. When a peripheral device is ready to transfer data, it makes a DMA request. If two DMA requests occur simultaneously, the lowest numbered DMA channel will be acknowledged first.

A DMA request causes a break in the CPU processing of the software at the next CPU cycle, if it occurs in sufficient time prior to the start of the next CPU cycle. A DMA break can occur between fetch and execute phases of a software instruction or it could, for example, happen between DMC data transfer cycles. Once the DMA break has been initiated, the DMA cycles will continue to occur as long as further DMA requests are received in sufficient time prior to the end of the current CPU cycle. A DMA break effects the CPU only to the extent that it requires main memory cycles. If a DMA request should cause a DMA break during that portion of a software instruction not requiring a main memory cycle, the processing of the software instruction will continue uninterrupted. DMA data transfers occur independently of the software program. However, I/O software instructions are provided to load the address counter and range counter in order to set up a DMA transfer. I/O software instructions are also provided to monitor the range counter in order to determine, at any time, how many words of data remain to be transferred between the DMA peripheral device and main memory.

A DMA cycle is activated by a peripheral device DMA request. The DMA control logic priority network determines the request priority and enables the proper DMA channel logic. The contents of the CPU memory address register are transferred to the alternate memory address register for preservation. The DMA cycle starts a main memory cycle, which is a read or write cycle depending upon the high order bit of the address counter. The CPU memory address register is cleared and the contents of the address counter representing the address to be accessed in the first DMA cycle are placed in the CPU memory address register. The address counter is then incremented to form the address for the next DMA cycle. For a DMA read cycle, the contents of the addressed memory location are inhibited from the CPU memory register and placed in the alternate memory register. The alternate memory register is then transferred to the 16 output lines and from there to the external peripheral device. For a DMA write cycle, the external peripheral device data is transferred from the peripheral device to the alternate memory register via the 16 lines and from the alternate memory register to the addressed main memory location.

If end-of-range is reached, the peripheral device disables its DMA request lines and DMA transfers from the channel are terminated. End-of-range is detected by the DMA control logic determining if the range counter equals all binary ONE's. The contents of the range counter are then incremented. The DMA control logic again searches its DMA request lines. If any are active, it causes another DMA cycle. If no DMA request exists, the DMA control logic returns the control to the CPU after transferring the contents of the alternate memory address register into the CPU memory address register.

Thus it can be seen that the Honeywell DDP-516 computer software programmer when programming an input/output transfer must be cognizant of whether the I/O controller for the peripheral device is a Direct Memory Access (DMA) IOC or a Data Multiplex Control (DMC) IOC. This cognizance is required because of the way in which the software initiates the data transfer. In the case of a DMC type IOC, the software programmer must store the address information within the main memory using non-I/O software instructions and then initiate the transfer by giving the peripheral devices' IOC a go signal using an I/O software instruction; whereas in the case of a DMA type IOC, the software programmer sends the address information to the DMA IOC by using I/O software instructions and then initiates the data transfer with another I/O software instruction. This presents a problem in that, for example, a serial line printer because of the relatively low transfer rate of the data may be controlled by a DMC type IOC, whereas a high-speed line printer may be controlled by a DMA IOC. Because of the difference in software programming methods used on the two types of printers, the substitution of one type of printer for the other and the consequent change in IOC type will also necessitate a software program change.

U.S. Pat. No. 4,292,668 entitled "Data Processing System Having Data Multiplex Control Bus Cycle" improved the DMC data transfer operation by having the CPU read the address and range from memory for the transfer of each data byte, receiving each data byte and transferring the data byte over the data bus and the address over the address bus.

OBJECTS OF THE INVENTION

It is an object of the invention to provide improved direct memory transfer apparatus and method.

SUMMARY OF THE INVENTION

A microprogrammed data processing system includes a central processing system, a main memory and a mass storage controller. A block of information is transferred between main memory and the mass storage controller during data multiplex control (DMC) cycles.

The CPU stores the main memory address of the first data byte of the block and the range, that is, the number of data bytes in the block. Since each address location in main memory stores 2 bytes, there are one of four possible main memory operations:

(1) Read left byte;
(2) Read right byte;
(3) Write left byte; and
(4) Write right byte.

The logic identifies one of four signals DATRQ0-00, DATRQ1-00, DATRQ2-00 or DATRQ3-00 to indicate the type of operation. Apparatus in the CPU is responsible to each signal to cause the CPU to interrupt the microprogram that is operative to branch to a particular microprogram to process the specified operations.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

DESCRIPTION OF THE PREFERRED EMBODIMENT

Figure 1:
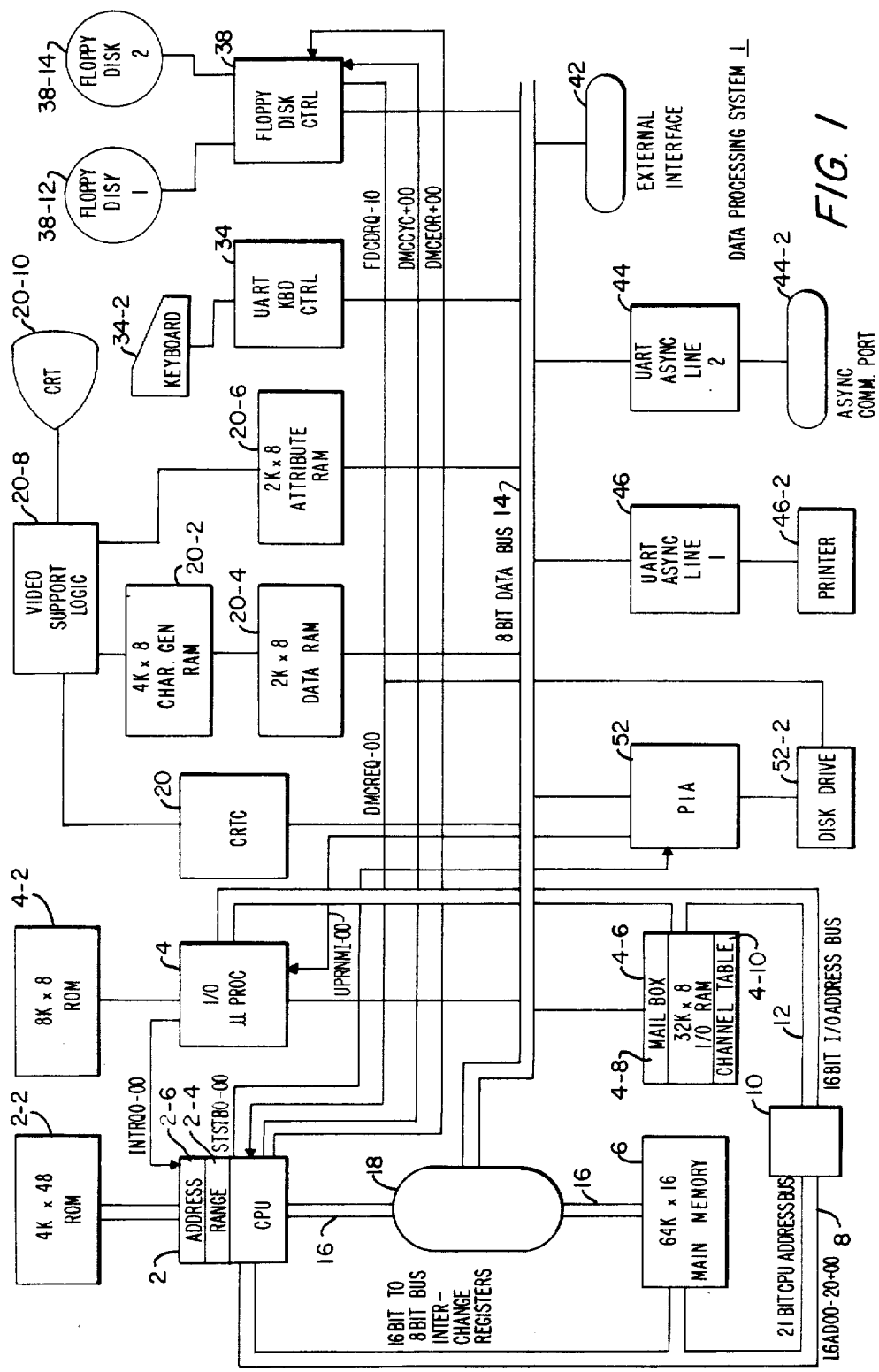
FIG. 1 is an overall block diagram of the major units of the system.

FIG. 1 is an overall diagram of a data processing system 1 which includes a firmware controlled central processor unit (CPU) 2 as an application processor and a I/O microprocessor 4 as an input/output processor.

Systems applications are performed by the CPU 2 executing software programs stored in a 64K by 16-bit word main memory 6. The microprograms used by the CPU 2 to execute the software instructions are stored in a 4K by 48-bit word read only memory 2-2.

Associated with I/O microprocessor 4 are an 8K by 8-bit byte read only memory (ROM) 4-2 and a 32K by 8-bit byte random access memory (RAM) 4-6. The ROM 4-2 stores the firmware routines necessary for the start up and the initialization of the data processing system 1. The RAM 4-6 stores tables, communications control programs and firmware for emulating a universal asynchronous receive transmit controller (UART) 44, firmware for controlling a number of devices including a keyboard 34-2 by means of a UART 34, floppy disks by means of a floppy disk controller (FDC) 38, a printer 40-2 by means of a UART 46 and a cathode ray tube controller (CRTC) 20. The RAM 4-6 also includes a number of address locations, a "mailbox", which are used by the CPU 2 and I/O microprocessor 4 to communicate with each other.

CPU 2 and main memory 6 are coupled to each other by a 21-bit address bus 8 and a 16-bit data bus 16. Data is transferred between CPU 2 and main memory 6 over data bus 16 from an address specified by CPU 2.

Data bus 16 is coupled to bus interchange registers 18. Also coupled to bus interchange registers 18 is an 8-bit data bus 14. Bus interchange registers 18 receives 16-bit data words from data bus 16 for transfer over data bus 14 as two 8-bit bytes, and also receives 8-bit bytes from data bus 14 for transfer over data bus 16. The I/O microprocessor 4, RAM 4-6, CRTC 20, UART's 34, 44 and 46, and FDC 38 are all coupled in common to data bus 14.

A 16-bit I/O address bus 12 is coupled to address bus 8 by a transceiver 10 and also coupled to I/O microprocessor 4 and I/O RAM 4-6, thereby enabling both CPU 2 and I/O microprocessor 4 to address main memory 6 and RAM 4-6.

Also coupled to data bus 14 are a peripheral interface adapter 52 for controlling a disk drive 52-2, an asynchronous line UART 44 for receiving and transmitting data characters via an asynchronous port 48, a 2K by 8-bit word data random access memory (RAM) 20-4 for storing characters for display on a CRT 20-10 and a 2K by 8-bit word attribute random access memory (RAM) 20-6 for storing attribute characters. Attribute characters are used typically for such CRT 20-10 display functions as underlining characters or character fields or causing certain selected characters or character fields to blink or be displayed with higher intensity. Character codes stored in RAM 20-4 are applied to a 4K by 8-bit word character generator random access memory (RAM) 20-2 which generates the codes representative of the raster lines of data which display the characters on the face of the CRT 20-10. A video support logic 20-8 is coupled to the CRTC 20, character generator RAM 20-2 and attribute RAM 20-6 for generating the lines of characters on the face of the CRT 20-10.

The FDC 38 is typically an NEC μPD765 single/double density floppy disk controller described in the NEC 1982 Catalog published by NEC Electronics USA Inc., Microcomputer Division, One Natick Executive Park, Natick, Mass. 01760.

The I/O microprocessor 4 is typically a Motorola MC68B09 8-bit microprocessing unit. The PIA 52 is typically a Motorola MC68B21 peripheral interface adapter. The CRTC 20 is typically a Motorola MC68B45 CRT controller.

The I/O microprocessor 4, PIA 52 and CRTC 20 are described in the Motorola Microprocessor Data Manual, copyright 1981 by Motorola Semiconductor Products Inc., 3501 Bluestein Blvd., Austin, Tex. 78721.

The UART's 34, 44 and 46 are Signetics 2661 Universal Asynchronous Receive Transmit Controllers described in the Signetics MOS Microprocessor Data Manual, copyright 1982 by Signetics Corporation, 811 East Arques Avenue, Sunnyvale, Calif. 94086.

This invention relates to the initiation and control by the CPU 2 of the data transfer over data bus 14 between the mass storage device, floppy disk 1 38-12, floppy disk 2 38-14 or disk drive 52-2 and the I/O RAM 4-6, or the main memory 6 over data buses 14 and 16.

The logic elements and firmware involved in the mass storage memory data transfer are known as the data multiplex control (DMC) facilities. The bus cycle during which the data is transferred is referred to as a DMC cycle.

GENERAL DESCRIPTION OF OPERATION

There are three phases of operation to a DMC data transfer. During the first phase of operation, the initiation phase, the CPU 2 indicates to the I/O microprocessor 4 by means of an input/output load instruction (IOLD) and a number of input/output instructions to condition the selected mass storage device to either read from the disk or write on the disk a block of data bytes.

Figure 2:
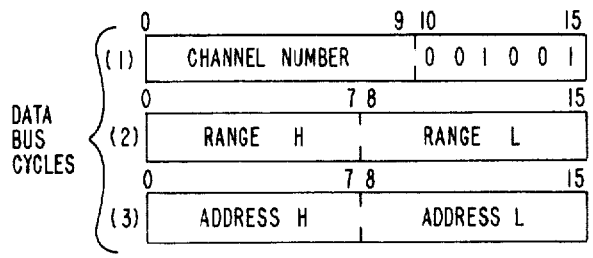
FIG. 2 shows the bit configuration of the IOLD, the input/output instructions and the input/output mailbox.
Figure 2:
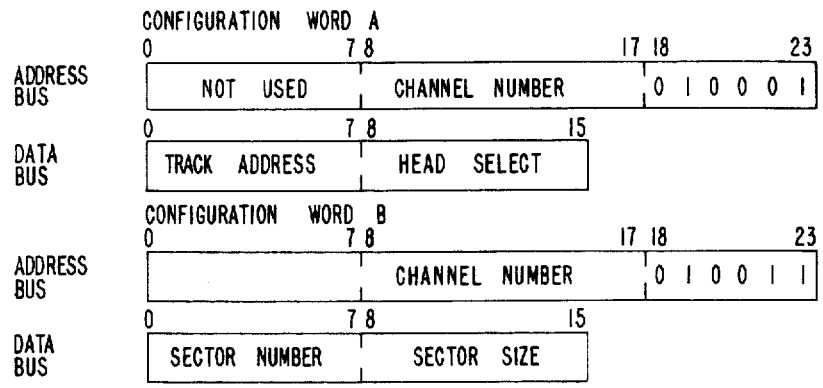
Figure 2:
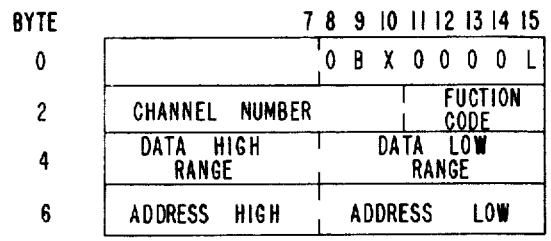
Figure 3:
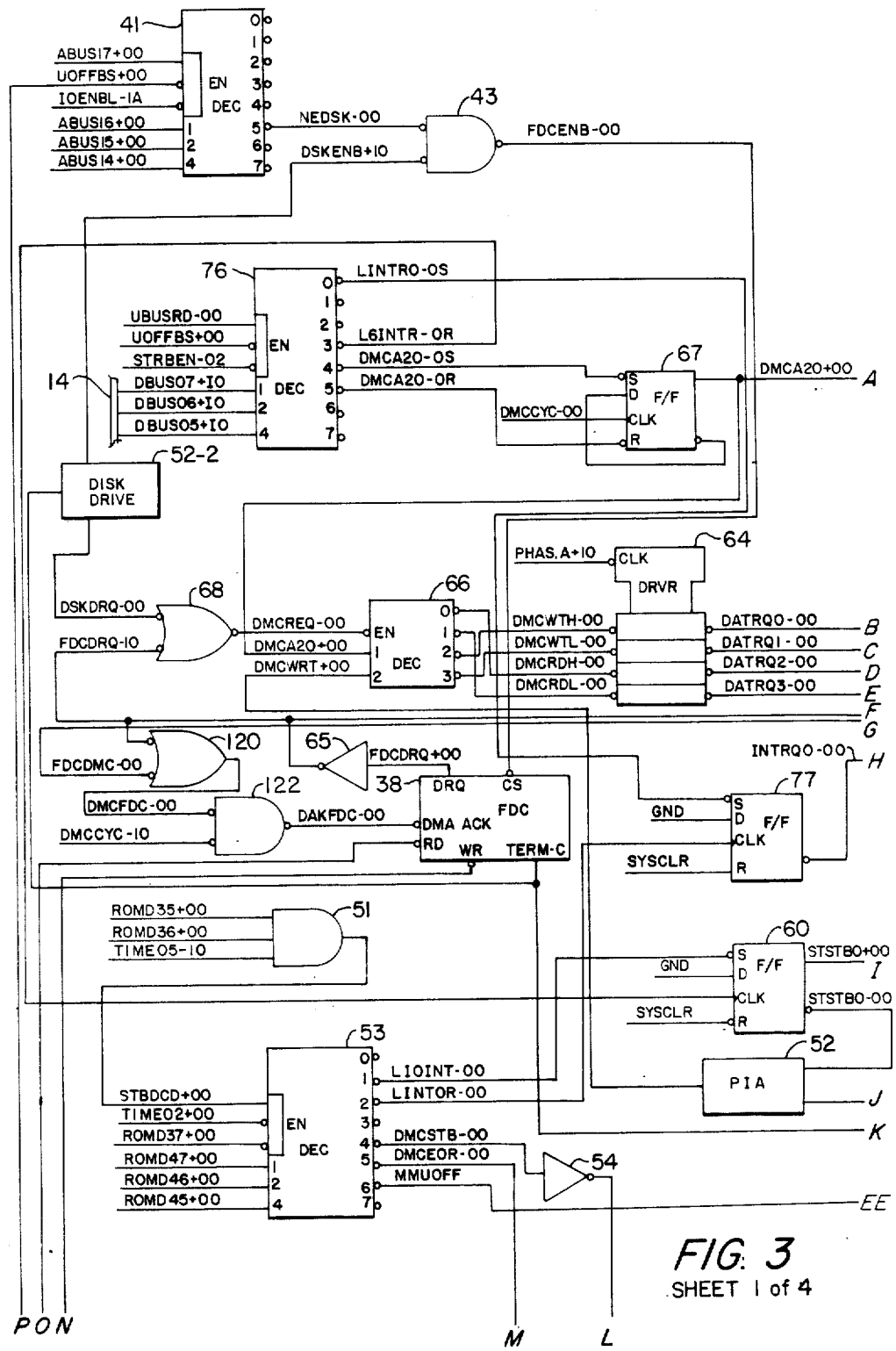
FIG. 3 comprises four sheets and shows the detailed logic of the DMC operation.
Figure 3:
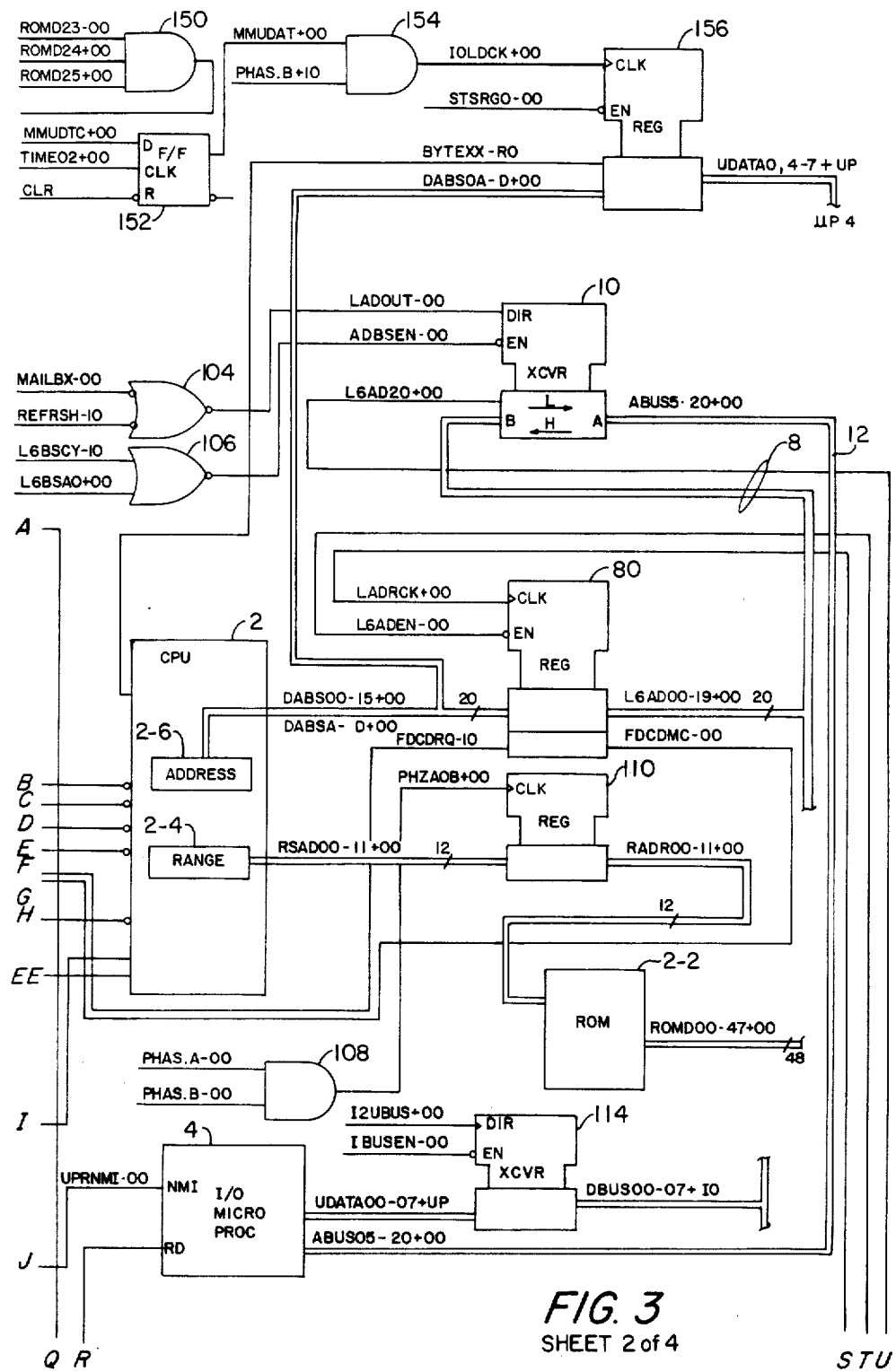
Figure 3:
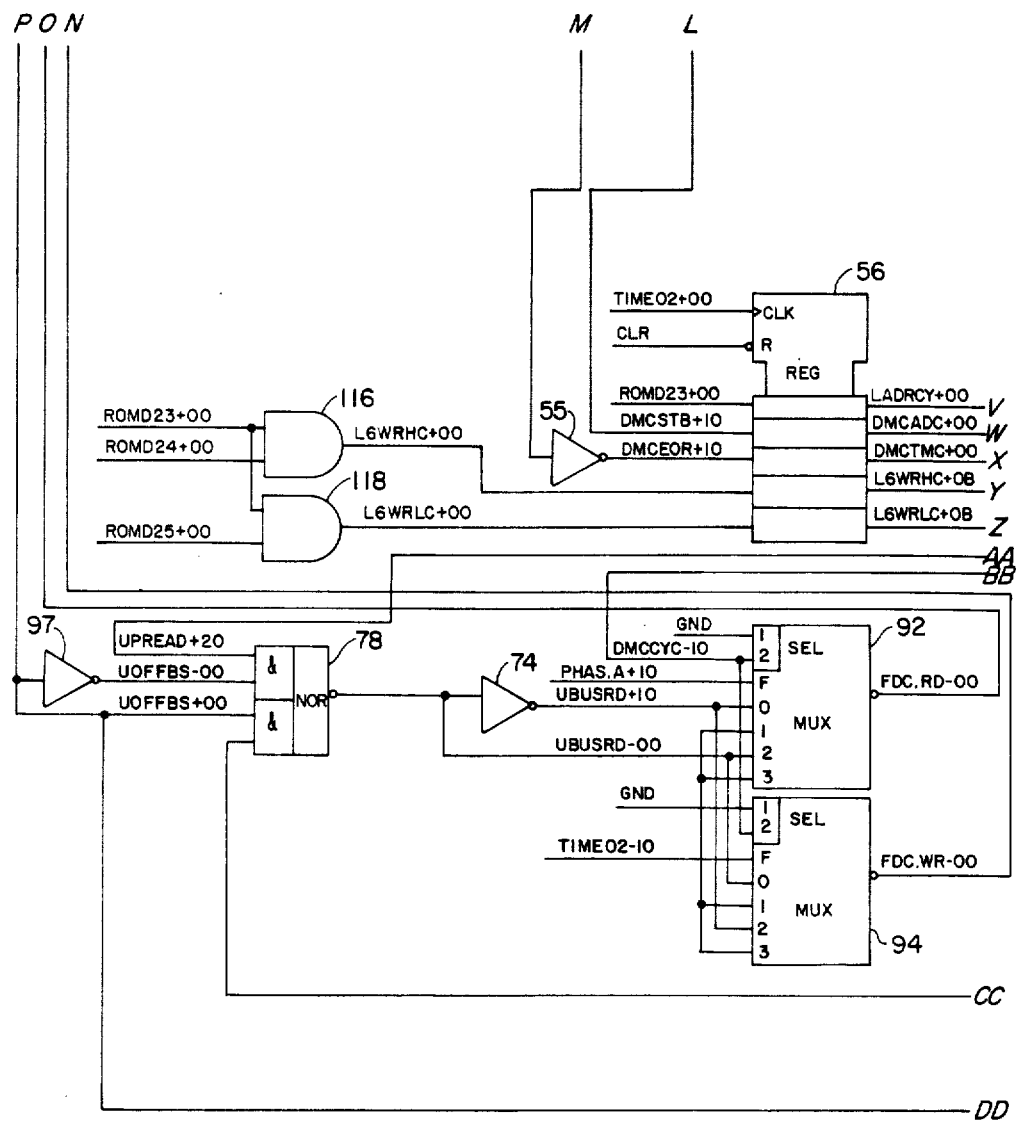
Figure 3:
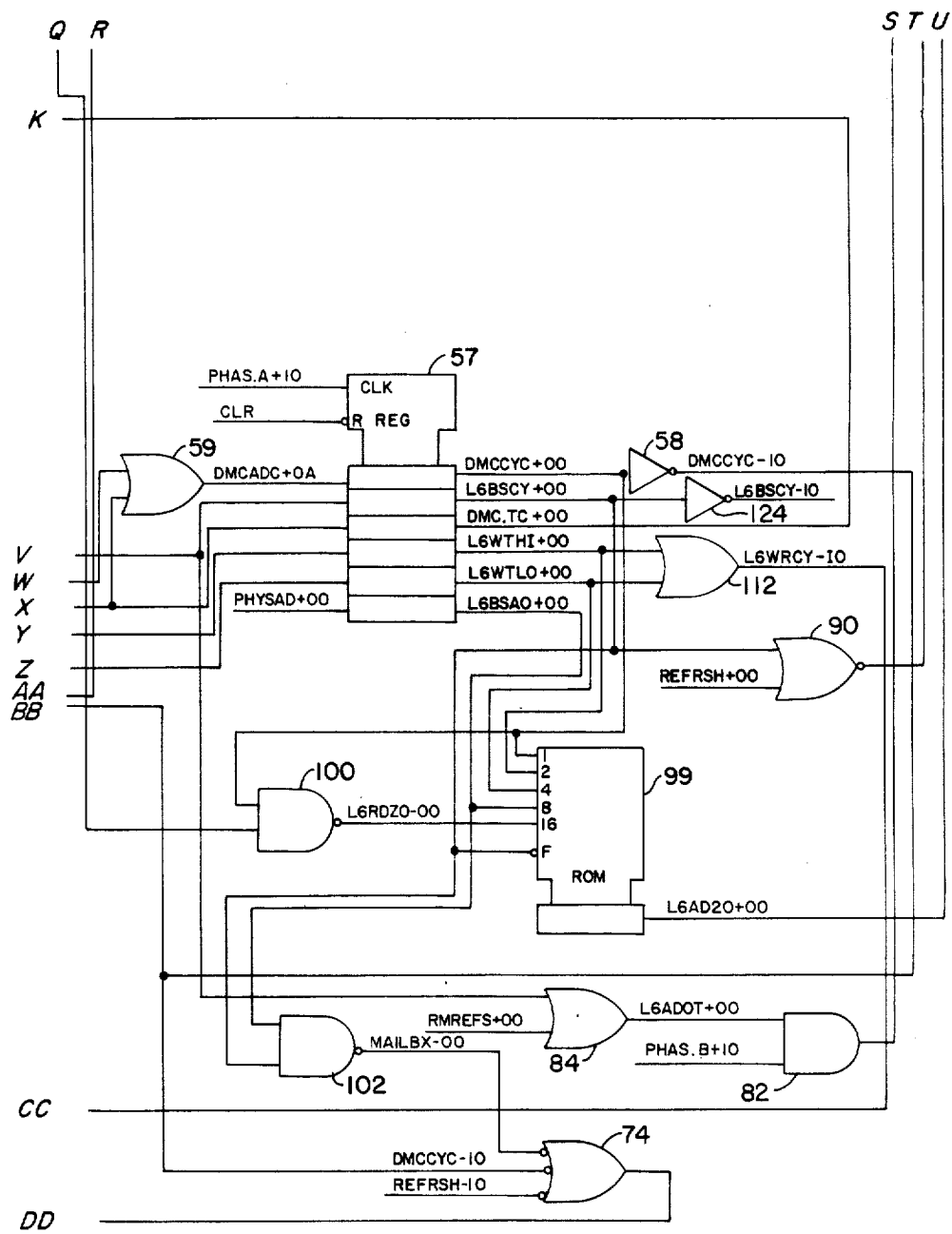

The IOLD instruction format as shown in FIG. 2 is transferred from main memory 6 to the mailbox 4-8 of I/O RAM 4-6 under the control of CPU 2. The IOLD is identified by hexadecimal 09 in bit positions 10 through 15 of data bus cycle 1. The channel number as shown in bit positions 0 through 9 of data bus cycle 1 identify the peripheral device involved in the data byte transfer and whether the peripheral device will be in a read mode or a write mode. The 16-bit range indicating the number of data bytes in the data transfer is shown as divided into 2 bytes, range high and range low. This is necessary since data bus 14 is an 8-bit bus. Sixteen bits of the 21-bit address are shown as divided into 2 bytes, address high and address low. The transfer of the remaining 5 bits of address is accomplished by the logic as shown in FIG. 3. The address identifies the main memory 6 or I/O RAM 4-6 locations of the data byte being transferred to or from the mass storage device.

There are two I/O instructions as shown in FIG. 2: configuration word A, function code hexadecimal 11, as shown in bit positions 18 through 23 of the address bus; and configuration word B, function code hexadecimal 13, as shown in bit positions 18 through 23 of the address bus. The channel numbers as shown in bit positions 8 through 17 of the address bus of configuration word A and configuration word B will be the same as the IOLD channel numbers described above for the specified mass storage device. A third I/O instruction (not shown) having a function code of hexadecimal 07 is used by the I/O microprocessor 4 to query a flag in the I/O RAM 4-6 which was set to indicate that a mass storage controller was conditioned for a mass storage operation.

Configuration word A selects the track in bit positions 0 through 7 of the data bus and selects the head in bit positions 8 through 15 of the data bus. Configuration word B selects the sector around the track in bit positions 0 through 7 of the data bus and indicates the sector size in bit positions 8 through 15 of the data bus. Note that for the floppy disk 38-2, the channel number for a read operation onto the disk is hexadecimal 0400 and the write operation onto the disk is hexadecimal 0401. Similarly, for the floppy disk 38-4, the read channel number is hexadecimal 0480 and the write channel number is hexadecimal 0481. For the disk drive 52-2, the read channel number is hexadecimal 0500 and the write channel number is hexadecimal 0501.

At the conclusion of phase one, therefore, the channel table 4-10 for the specified channel number store the address and range received from the IOLD and the location on the disk of the data bytes received from the I/O instructions either to be written on or to be read from the disk.

During the second phase of operation, the CPU 2 controls the transfer of data bytes between the floppy disk controller (FDC) 38 or the disk drive 52-2 and I/O RAM 4-6 or main memory 6.

During the third phase of operation, the CPU 2 indicates to the FDC 38 or the disk drive 52-2 that the last data byte of the data block is being transferred and also indicates to the DMC facilities that the data transfer is concluded.

DETAILED DESCRIPTION OF OPERATION

The first phase of operation starts when the CPU 2 while executing its application programs executes an instruction calling for a mass storage/memory data transfer.

Referring to FIG. 1, the CPU 2 stores the IOLD in the mailbox 4-8 in I/O RAM 4-6 via address buses 8 and 12 and data buses 16 and 14. The CPU 2 then interrupts I/O microprocessor 4 via signal STSTB0−00, PIA 52 and signal UPRNMI−00 to transfer the IOLD stored in the mailbox 4-8 to the channel area 4-10 of I/O RAM 4-6.

Referring to FIG. 3, signal STSTB0−00 is generated as one output signal of a flop 60 which is set by signal LIOINT−00 at logical ZERO from a decoder 53. Decoder 53 is enabled by ROM 2-2 signals ROMD35+00 and ROMD36+00 at logical ONE applied to an AND gate 51 to force enable signal STBDCD+00 to logical ONE. Signals ROMD37+00, ROMD45+00 and ROMD46+00 at logical ZERO, and signal ROMD47+00 at logical ONE applied to decoder 53 forces signal LIOINT−00 to logical ZERO thereby setting flop 60. Output signal STSTB0−00 at logical ZERO is applied to PIA 52 which generates signal UPRNMI−00 at logical ZERO thereby interrupting I/O microprocessor 4. Signal TIME05−10 applied to AND gate 51 and signal TIME02+05 enabling decoder 53 provides the timing for the decoder 53 output signals.

I/O microprocessor 4 transfers the IOLD from mailbox 4-8, FIG. 1, to the channel table area 4-10 of I/O RAM 4-6. The particular channel table into which the IOLD is stored is identified by the contents of the channel number field, bit positions 8 through 17 of the address buses 8 and 12 as shown in FIG. 2.

When flop 60 is reset, CPU 2 tests output signal STSTB0+00 which indicates when the I/O microprocessor 4 has completed the transfer of the IOLD from mailbox 4-8 to channel table 4-10. Flop 60 is reset on the rise of a signal L6INTR−OR from a decoder 76 which is enabled by signal UBUSRD−00 at logical ONE and signals UOFFBS+00 and STRBEN−02 at logical ZERO. Signal STRBEN−02 is forced to logical ZERO by predetermined address bus signals (not shown) generated by I/O microprocessor 4 over address bus 12. Signal UBUSRD−00, generated by I/O microprocessor 4, at logical ONE indicates that this is not an I/O microprocessor 4 read operation and signal UOFFBS+00 indicates that this is not an I/O microprocessor 4 operation.

Data bus 14 signal DBUS05+IO at logical ZERO and signals DBUS06+IO and DBUS07+IO at logical ONE applied to decoder 76 force signal L6INTR−OR to logical ZERO. Flop 60 resets at the end of the I/O microprocessor 4 cycle on the rise of signal L6INTR−OR. Signal STSTB0+00 from flop 60 returning to logical ZERO indicates to CPU 2 that the IOLD has been processed by the I/O microprocessor 4.

The CPU 2 senses the end of the I/O microprocessor 4 transfer of the IOLD from the mailbox 4-8 to the channel table 4-10 and loads the mailbox with the I/O configuration A instruction information. Again the I/O microprocessor 4 is interrupted as described above to store the track address and head select information in channel table 4-10. Again the CPU 2 senses the end of the I/O microprocessor 4 cycle and transfers the I/O configuration B instruction information to the mailbox 4-8. The I/O microprocessor is again interrupted to transfer the sector number and sector size to the channel table 4-10.

If the DMC channel is available, the I/O microprocessor 4 which keeps track of the DMC channel assignments reads the particular channel table 4-10 and transfers the track address, head select, sector number and sector size to the FDC 38 or the disk drive 52-2. The I/O microprocessor 4 will also transfer the address and range information from the particular channel table 4-10 to the mailbox 4-8.

The I/O microprocessor 4 then interrupts the CPU 2 via the INTRQ0−00 signal. The CPU 2 responds by transferring the address and range from the mailbox 4-8 into a 20-bit address register 2-6 and a 16-bit range register 2-4.

Interrupt signal INTRQ0−00 is forced to logical ZERO when a flop 77 is set. Signal LINTR0−0S, the output of decoder 76, is forced to logical ZERO when the data bus 14 signals DBUS05+00, DBUS06+00 and DBUS07+00 are at logical ZERO and decoder 76 is enabled as described above.

CPU 2 is responsive to the INTRQ0−00 interrupt signal to address mailbox 4-8 of I/O RAM 4-6 to transfer the 20-bit address to register 2-6 and the 16-bit range to register 2-4.

The I/O microprocessor 4 issues a read or write order to the FDC 38 or the disk drive 52-2. For this example assume the read or write order is issued to the FDC 38 by the I/O microprocessor 4 generating a floppy disk enable signal FDCENB−00 to FDC 38 by a decoder 41 signal NEDSK−00 and a negative AND gate 43. Address bus 12 signals ABUS14+00, ABUS16+00 and ABUS17+00 at logical ONE and signal ABUS15+00 at logical ZERO generate signal NEDSK−00 at logical ZERO. Disk enable signal DSKENB+10 applied to negative AND gate 43 is at logical ZERO since the disk drive 52-2 was not addressed by I/O microprocessor 4. The I/O enable signal IOENBL−1A is at logical ZERO indicating that an input/output order is being processed. Also the UOFFBS+00 signal is at logical ZERO since the inputs to a NOR gate 74 indicate that this is not a mailbox 4-8 read or write operation, this is not a DMC cycle and this is not a memory refresh operation, i.e., signals MAILBX−00, DMCCYC−10 and REFRSH−10 are at logical ONE.

The FDC 38 responds to the I/O configuration A and configuration B instructions by issuing signal FDCDRQ+00 indicating that the floppy disk 1 38-12 or floppy disk 2 38-14 has responded to its channel number and has positioned the head to the proper track on the disk and is ready to either receive a data byte from memory, I/O RAM 4-6 or main memory 6 or transmit a data byte to memory.

The FDCDRQ+00 signal is inverted to signal FDCDRQ−10 by and inverter 65 which is applied to a negative OR gate 68. The output signal DMCREQ−00 enables a decoder 66. Signal DSKDRQ−00 applied to negative OR gate 68 indicates if the disk drive 52-2 is requesting a data transfer.

The state of a flop 67 indicates if the CPU 2 word address stored in register 2-6 represents a left byte when set or a right byte when not set. The flop 67 will toggle as a block of data bytes are transferred between memory and the FDC 38, successive bytes going alternatively into the left byte location then the right butye location of a word address.

Assuming flop 67 is set and signal DMCA20+00 is at logical ONE, then the decoder 66 will generate signal DMCRDL−00 at logical ZERO for a read operation or signal DMCWTL−00 at logical ZERO for a write operation. Assuming a left byte read operation, signal DMCWRT+00 from PIA 52 at logical ZERO, signal DMCRDL−00 will remain at logical ZERO and signal DATRQ1−00 will pulse in synchronism with the PHAS.A+10 signal applied to a driver 64.

The IOLD instruction as shown in FIG. 2 shows the 16 address bits being transferred from CPU 2 to I/O RAM 4-6 over data buses 16 and 14 on data bus 16 cycle (3). The remaining five high order address bits, signals BYTEXX−R0 and DABSOA+00 through DAB-SOD−00, bypass the address bus 8 and are stored directly in IOLD register 156 under the control of ROM 2-2 signals ROMD23+00, ROMD24+00 and ROMD25+00 applied to an AND gate 150. Output signal MMUDTC+00 sets a flop 152 on the rise of timing signal TIME02+00. Output signal MMU-DAT+00 is applied to an AND gate 154 to generate clock signal IOLDCK+00 at clock signal PHAS.B+10 time. The five high order address signals appear as signals UDATA0+UP and UDATA4+UP through UDATA7+UP which are applied to I/O microprocessor 4 by signal STSRG0+00. Signal STSRG0+00 is generated by CPU 2 address bus signals (not shown).

I/O microprocessor 4 generates signals DBUS05+IO, DBUS06+IO and DBUS07+IO in response to signal UDATA0+UP (BYTEXX−R0) to generate data bus 14 signals DBUS05+IO, DBUS06+IO and DBUS07+IO which are applied to decoder 76. Output signal DMA20−02 or DMA20−0R is generated to initially set or reset flop 67 to indicate that the first data byte of the block transfer will be either written into or read from a right byte when flop 67 is reset and a left byte when flop 67 is set.

The second phase of operation starts by the CPU 2 generating a DMCCYC+00 signal to initiate the DMC cycle. Decoder 53 is enabled by ROM 2-2 signals ROMD35+00 and ROMD36+00 at logical ONE applied to AND gate 51 which generates strobe signal STBDCD+00 at logical ONE. Also signal ROMD37+00 at logical ZERO is applied to an enable input terminal of decoder 53. Signals ROMD46+00 and ROMD47+00 at logical ZERO and signal ROMD45+00 at logical ONE force the DMC strobe signal DMCSTB−00 to logical ZERO. Timing signals TIME05−10 at logical ONE and TIME02+00 at logical ZERO provide the timing for the DMCSTB−00 signal. The DMCSTB−00 signal is stored in a register 56 on the next rise of the TIME02+00 signal via an inverter 54 and signal DMCSTB+10. The output signal DMCADC+00 is applied to an OR gate 59. The output signal DMCADC+0A is stored in a register 57 on the rise of the PHAS.A+10 clock signal. The output signal DMCCYC+00 and signal DMCCYC−00 from an inverter 58 define the DMC cycle.

Clock signal LADRCK+00 stores the 20 address signals DABS 00−15+00 and DABS A−D+00 in a register 80 from CPU 2 register 2-6 for transfer out on address bus 8 as signals L6AD00−19+00. Signal LADRCK+00 is generated by a ROM 2-2 signal ROMD23+00 which is clocked into register 56 by timing signal TIME02+00 to generate signal LADRCY+00 which is applied to an OR gate 84. An output signal L6ADOT+00 is applied to an AND gate 82 to generate the address clocking signal LADRCK+00 which is timed to the PHAS.B+10 clocking signal.

The address signals DABS 00−15+00 and DABS A−D+00 are placed on the address bus 8 as address signals L6AD00−19+00 by register 80 being enabled by signal L6ADEN−00, the output of a NOR gate 90. Signal L6ADEN−00 is generated by address cycle signal LADRCY+00, stored in register 57 at PHAS.A+10 time. Register 57 generates output signal L6BSCY+00 which is applied to NOR gate 90 to generate the L6Aden−00 signal to enable register 80. Signal L6ADEN−00 is also generated during a memory refresh cycle by signal REFRSH+00 applied to NOR gate 90.

Request signal FDCDRQ−10 is also stored in register 80. The output signal FDCDMC−00 is applied to the DMA acknowledge terminal of FDC 38 as signal DAKFDC−00 to indicate that the CPU 2 address was sent out on address bus 8 during the DMC cycle. Signal DAKFDC−00 is generated at logical ONE by a negative AND gate 122 when signals DMCCYC−10 and DMCFDC−00 are at logical ZERO. Signal FDCDRQ−10 and signal FDCDMC−00 at logical ONE applied to a NOR gate 120 forces signal DMCFDC−00 to logical ZERO. This assures that signal DAKFDC−00 is applied to FDC 38 after the DMC cycle is concluded.

CPU 2 generates an L6WRHC+00 signal to indicate a write right byte operation by applying ROM 2-2 signals ROMD23+00 and ROMD24+00 at logical ONE to an AND gate 116. Also CPU 2 generates an L6WRLC+00 signal to indicate a write left byte operation by applying signals ROMD23+00 and ROMD25+00 at logical ONE to an AND gate 118. Signals L6WRHC+00 and L6WRLC+00 are stored in register 56 at clock signal TIME02+00 time. Output signals L6WRHC+0B and L6WRLC+0B are stored in register 57 at clock signal PHAS.A time. Output signals L6WRHI+00 and L6WTL0+00 are applied to an OR gate 112 to generate an L6WRCY−IO signal indicating a CPU 2 write cycle. Output signal UOFFBS+00 from NOR gate 74 is at logical ONE indicating a CPU 2 cycle and not an I/O microprocessor 4 cycle during each DMC cycle and is applied to an AND/NOR gate 78 as is signal L6WRCY−IO thereby forcing output signal UBUSRD−00 to logical ZERO during write cycles. Signal UBUSRD−00 is applied to one input terminal 0 of MUX 94 which is selected during the DMC cycle since signal DMCCYC−10 applied to select terminal 2 is at logical ZERO thereby generating the FDC.WR−00 signal at logical ZERO thereby forcing an FDC 38 write DMC cycle. If signal L6WRCY−10 is at logical ZERO indicating a CPU 2 read cycle, then output signal UBUSRD+10 from an inverter 74 is applied to input terminal 0 of MUX 92. The MUX 92 output signal FDC.RD−00 at logical ZERO would force an FDC 38 read DMC cycle.

When the I/O microprocessor 4 is commuinicating with the FDC 38, the UPREAD+20 signal which is generated by the I/O microprocessor 4 and signal UOFFBS−00 from an inverter 97 control the generation of the FDC.RD−00 or FDC.WR−00 signal. In this case, signal DMCCYC−10 is at logical ONE thereby selecting input terminal 2 of MUX's 92 and 94. For the read cycle, signal UBUSRD−00 at logical ZERO is applied to input terminal 2 of MUX 92, forcing signal FDC.RD−00 to logical ZERO. For the write cycle, signal UBUSRD+10 at logical ZERO is applied to input terminal 2 of MUX 94, forcing signal FDC.WR−00 to logical ZERO. MUX 92 is enabled during clock signal PHAS.A+10 and MUX 94 is enabled during clock signal TIME02+10, FIG. 4.

A ROM 99 generates the low order CPU 2 address signal L6AD20+00. The following signals are applied to the input address terminals of ROM 99:

Signal DMCCYC+00 indicates a DMC cycle;
Signal L6BSCY+00 which enables ROM 99 indicates a CPU 2 bus cycle;

Signal L6WTHI+00 indicates a write right byte operation;

Signal L6WTL0+00 indicates a write left byte operation;

Signal L6BSA0+00 indicates that this is a CPU 2 operation and not an I/O microprocessor 4 operation; and Signal L6RD20−00, the output of a NAND gate 100, indicates whether the CPU 2 sending a left byte or a right byte at DMC cycle time.

The 21 address bus 8 signals L6AD00−20+00 from register 80 are applied to the B terminals of transceiver 10. The 16 address bus 12 signals ABUS05−20+00 are applied to the A terminals of transceiver 10. The transceiver 10 is enabled by output signal ADBSEN−00 from a NOR gate 106 when the CPU 2 is not requesting a bus cycle; signal L6BSCY−10, an inverter 124 output, at logical ONE; or the CPU 2 is active and the I/O microprocessor 4 is inactive, signal L6BSA0+00 at logical ONE. Signal LADOUT−00, the output of a negative OR gate 104, establishes the direction from terminals B to terminals A of the transceiver 10 when at logical ZERO and from terminals A to terminals B.

During the DMC operation, signal MAIBX−00, the output of NAND gate 102, is at logical ZERO since signals BSCY+00 and L6BSA0+00 indicate that CPU 2 is active and I/O microprocessor 4 is inactive; therefore the address stored in CPU 2 register 2-6 will be transferred from address bus 8 through transceiver 10 to address bus 12. Also the transceiver 10 will transfer addresses from input terminal B to input terminal A during the memory refresh operation when signal REFRSH−10 is at logical ZERO. During I/O microprocessor 4 bus cycles, transceiver 10 transfers addresses from input terminal A to input terminal B when signal L6BSCY−10 at logical ONE indicates that the CPU 2 is not requesting a bus cycle.

CPU 2 addresses ROM 2-2 via signals RSAD 00−11+00, a register 110 and signals RADR 00−11+00. ROM 2-2 output signals ROMD 00−47+00 provide the firmware control of the CPU 2 logic. Register 110 sets on the rise of signal PH2A0B+00 which is the output of an AND gate 118. Signals PHAS.A−00 and PHAS.B−00 provide the inputs to AND gate 108.

In summary, for a floppy disk write operation during the DMC cycle, the memory address appears on the address bus 8 to address a left data byte in main memory 6 or the address appears on address buses 8 and 12 to address a left data byte in I/O RAM 4-6 to place the left data byte on the data bus 14 for transfer to FDC 38. For a floppy disk read operation, the data byte stored in the FDC 38 is transferred to I/O RAM 4-6 or main memory 6 during the DMC cycle.

For the next DMC cycle, flop 67 is reset to address the right byte in memory and signal DMCRDH−00 or DMCWTH−00 is selected for the read or write operation, respectively.

The CPU 2 decrements the range for each data byte transferred and generates a DMCEOR−00 signal from decoder 53 instead of the normal DMCSTB−00 signal during the third phase of operation. Signal DMCEOR−00, in addition to generating the DMCCYC−00 cycle via inverter 55, signal DMCEOR+10, register 56, signal DMCTMC+00, NOR gate 59, signal DMCADC+0A and register 57, also generates signal DMC.TC+00 which signals the FDC 38 that this is the last data byte being transferred.

Figure 4:
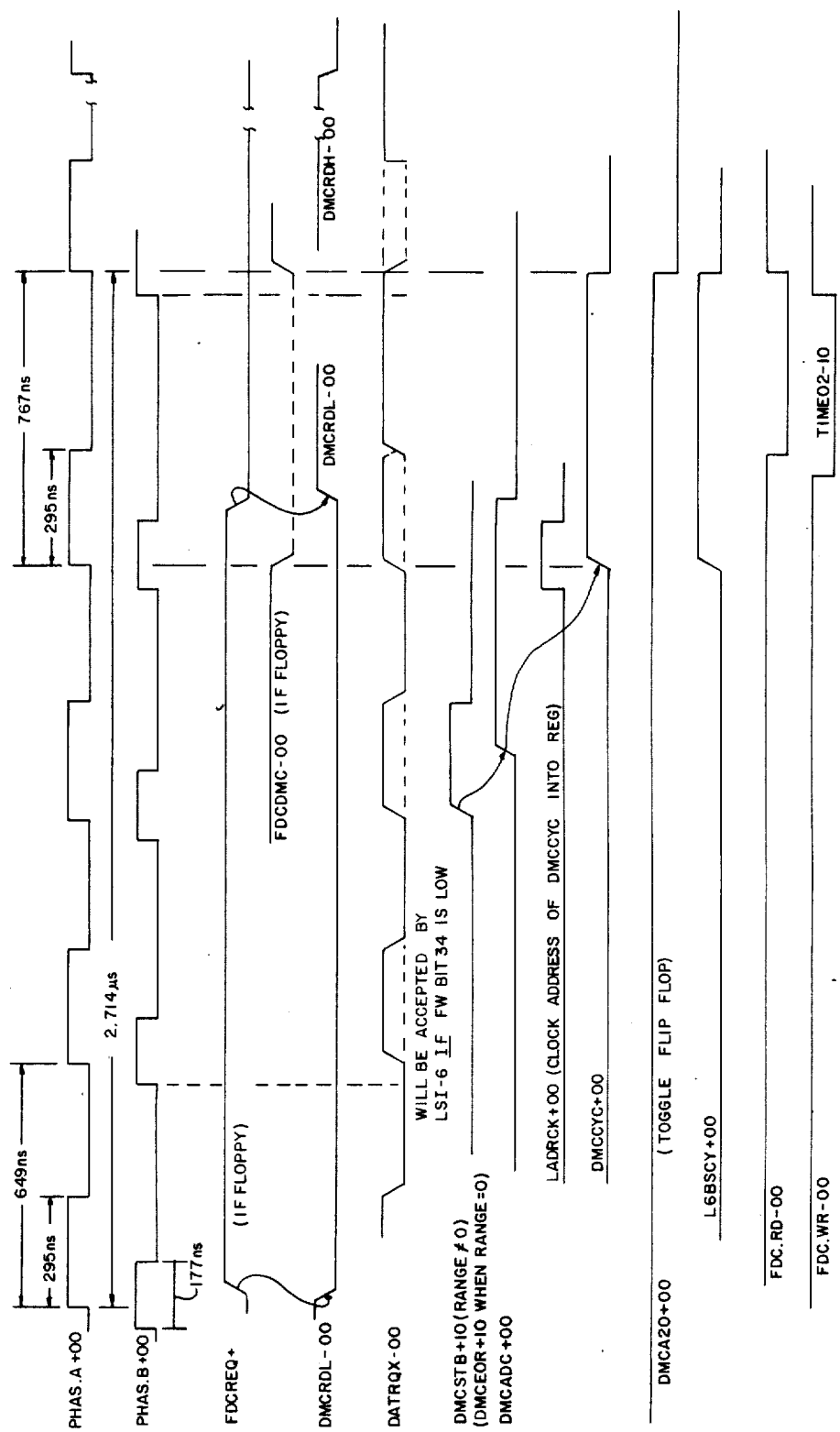
FIG. 4 shows the timing of the DMC operation.

FIG. 4 shows the timing of the DMC operation. The PHAS.A+00 and PHAS.B+00 signals are the basic timing signals of the DMC operation. The basic timing cycle is 649 nanoseconds which is stretched to 767 nanoseconds during the DMC cycle by keeping timing signals low for the additional 118 nanoseconds.

Assuming the floppy disk read or write operation, signal FDCREQ+ goes high to indicate that the FDC 38 has a data byte to transfer or is ready to receive a data byte to write on a floppy disk.

Signal FDCDMC−00 low acknowledges signal FDCREQ+. Signal DMCRDL−00 low indicates that a left byte is being transferred from main memory 6 or I/O RAM 4-6 to FDC 38. Signal DMCRDH−00 low indicates that a right byte is being transferred from main memory 6 or I/O RAM 4-6 to FDC 38.

Signal DATRQX+10 representative of signal DMCWTH−00, DMCWTL−00, DMCRDH−00 or DMCRDL−00 goes high when accepted by the CPU 2 on the PHAS.A+00 cycle in which signal ROMD34+00 is low.

Signal DMCSTB+00 high indicates a positive response to signal DATRQX−00. The CPU 2 accepted signal DATRQX−00 by extending a firmware routine in which a bit stored in ROM 2-2 and read out as signal ROMD34+00 is low.

Signal DMCADC+00 delays the start of the DMC cycle to allow time for the address stored in register 2-6 of CPU 2 transferred to a register 80 by signal LADRCK+00 prior to being placed on the address bus 8.

Signal DMCCYC+00 high defines the DMC cycle.

Signal DMCA20+00 assigns the DMC cycle for transferring the left data byte of the data word when high or the right data byte of the data word when low over the data bus 14 between FDC 38 or disk drive 52-2 and either I/O RAM 4-6 or main memory 6. Signal L6BSCY+00 enables register 80 to place the 20 address signals L6AD00−19+00 on the address bus 8. In addition, the 21st address signal indicating the left or right byte is placed on the address bus 8. Note that 16 address signals L6AD05+00 through L6AD20+00 are placed on address bus 12 by transceiver 10 as address signals ABUS05+00 through ABUS20+00, respectively.

Signal FDC.RD−00 when low results in the FDC 38 transferring the data byte to the data bus 14.

Signal FDC.WR−00 when low results in the FDC 38 receiving the data byte from the data bus 14.

Signal DMCEOR+10 is high for the last data byte of the transfer as indicated by the range stored in register 2-4 being decremented to ZERO. Signal DMCEOR+10 performs the same logical operations as signal DMCSTB+10 and in addition sends a signal DMC.TC−10 to the FDC 38 indicating end-of-range.

CPU 2 address bus 8 signals L6AD00−20+00 are applied to bidirectional transceiver (XCVR) 10 as are I/O microprocessor 4 bus signals ABUS05−20+00. A ROM 99 generates the low order CPU 2 address bus 8 signal L6AD20+00 to select the left or right byte of the main memory 6 or I/O ROM 4-6 data word. The ROM 99 is addressed by the DMC cycle signal DMCCYC+00, a CPU 2 write right byte signal L6WTHI+00, a CPU 2 write left byte signal L6WTL0+00, a signal L6BSA0+00 indicating that a CPU 2 address is on address bus 12, and a 21st address bit output signal L6RD20−00 from a NAND gate 100. NAND gate 100 is active during the DMC cycle when signal DMCCYC+00 is at logical ONE and when flop 67 is set forcing signal DMCA20+00 is at logical ONE indicating a left byte read or write operation. ROM 90 is enabled when signal L6BSCY+00 is at logical ZERO indicating that this is not a CPU 2 bus cycle.

Transceiver 10 is enabled by output signal ADBSEN−00 from a NOR gate 106 at logical ZERO. Transceiver 10 is enabled if either this is not a CPU 2 bus cycle, signal L6BSCY−10 is at logical ONE, or there is not a CPU 2 address on the address bus 8, signal L6BSA0−00 is at logical ONE. Transceiver 10 is disabled during a CPU 2 bus cycle.

Transceiver 10 transfers address bus signals from address bus 8 to address bus 12 when direction signal LADOUT−00 is at logical ONE and from address bus 12 to address bus 8 when signal LADOUT−00 is at logical ZERO. Signal LADOUT−00 is at logical ONE when memory is not being refreshed, signal REFRSH−10 applied to a negative OR gate 104 is at logical ONE and this is not a CPU 2 read mailbox operation, signal MAILBX−00 is at logical ONE. If either of signals REFRSH−10 and MAILBX−00 is at logical ZERO then signal LADOUT−00 is at logical ZERO.

Signal MAILBX−00 at logical ZERO indicates a CPU 2 read mailbox 4-8 operation since signals L6BSCY+00 and L6BSA0+00 applied to a NAND gate 102 are at logical ONE indicating a CPU 2 bus cycle and a CPU 2 address is on address bus 8.

Figure 5:
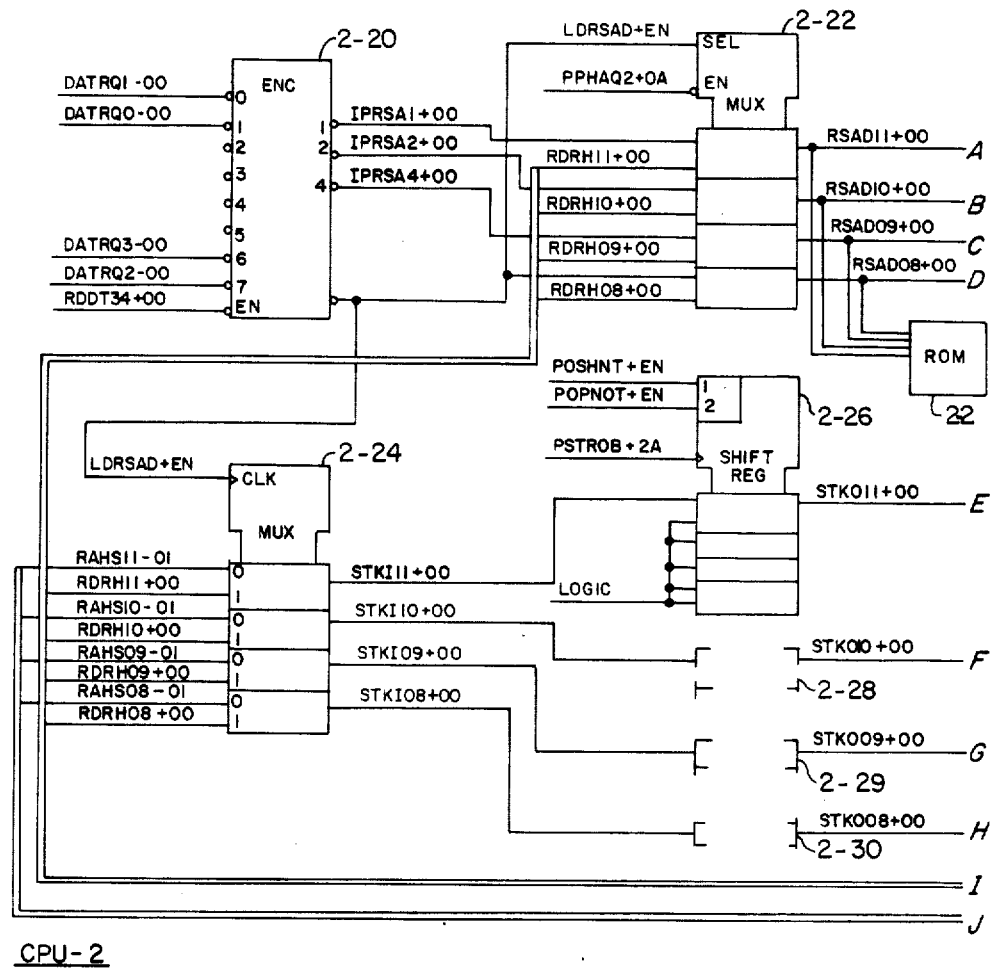
FIG. 5 comprises two sheets and shows the detailed interrupt and branching logic in the CPU.
Figure 5:
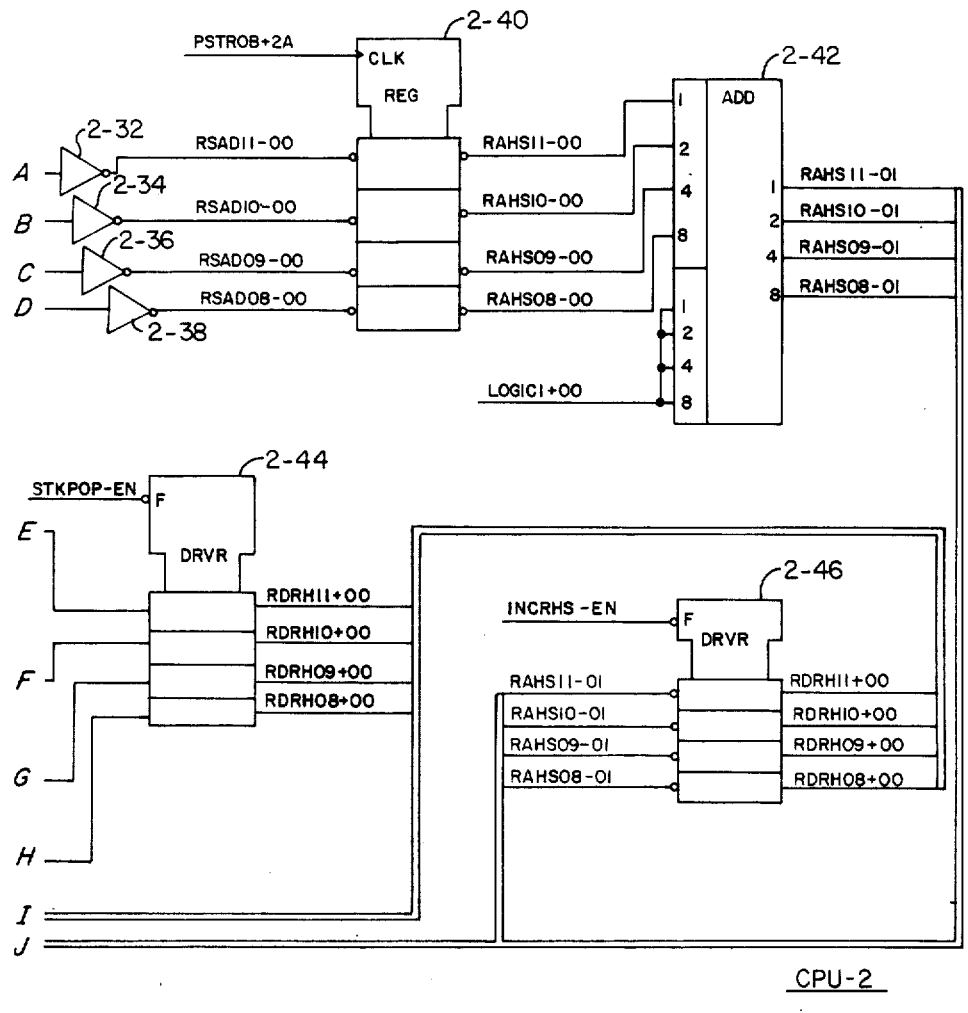

Referring to FIG. 5, the CPU 2 receives signal DATRQ0−00, DATRQ1−00, DATRQ2−00 or DATRQ3−00 indicating that the FDC 38, FIG. 3, or the disk drive 52-2 is calling for a data cycle via signals FDCDRQ−10 or DSKDRQ−00, and DMCREQ−00. The PIA 52 calls for a read or a write cycle via signal DMCWRT+00. Signal DATRQ0−00 indicates a write byte ZERO operation, that is, write the high order byte onto the mass storage device disk or diskette surface. Signal DATRQ1−00 indicates a write byte ONE operation, that is, write the low order byte onto the mass storage device disk or diskette surface.

Signals DATRQ2−00 and DATRQ3−00 indicate a read byte ZERO and a read byte ONE operation, respectively, from the mass storage device disk or diskette surface.

Signals DATRQ0−3−00 are applied to an encoder 2-20 which is enabled by a signal RDDT34+00 from ROM 2-2. The encoder 2-20 output signals IPRSA1+00, IPRSA2+00 and IPRSA3+00 are applied to input terminals 0 of a multiplexer (MUX) 2-22. When select signal LDRSAD+EN is at logical ZERO, indicating that one of the signals DATRQ0−00, DATRQ1−00 or DATRQ2−00 is at logical ZERO, then the input terminal 0 signals to MUX 2-22 are selected and applied to the address terminals of ROM 2-2 as signals RSAD09+00, RSAD10+00 and RSAD11+00.

The first microword of the microprogram which will process the mass storage data transfer is read from ROM 2-2. The address of the microword of the microprogram that was interrupted is stored in a register 2-40 via inverters 2-32, 2-34, 2-36 and 2-38, and signals RSAD08−00 through RASD11−00. The output signals RAHS08−00 through RSAH11−00 are incremented by an adder 2-12. Output signals RAHS08−01 through RAHS11−01 are stored in shift register 2-30, 2-29, 2-28 and 2-26, respectively, via a MUX 2-24 and signals STKI08+00 through STKI11+00. Shift registers 2-26, 2-28, 2-29 and 2-30 operate as a push-down, prop-up stack which stores the address of the next microword to be processed of the interrupted program.

The address of the first microword of the microprogram to process the mass storage data transfer, as well as addressing ROM 2-2, is stored in register 2-40 at PSTROB+2A time, and is incremented by adder 2-42 to generate the address of the second microword. The address of the second microword is applied to a driver 2-46. The output signals RDRH08+00 through RDRH11+00 are applied to the input terminals 1 of MUX 2-22. At this time, select signal LDRSAD+EN is at logical ONE. At clock signal PPHAQ2+0A time, the address of the second microword is applied to ROM 2-2 and also stored in register 2-40. Note that signals RDRH08+00 through RDRH11+00 are also applied to input terminals 1 of MUX 2-24; however, shift registers 2-26, 2-28, 2-29 and 2-30 are not enabled since signals PUSHNT+EN and POPNOT+EN are at logical ZERO.

The addresses of subsequent microwords are applied to ROM 2-2 as described above. The last microword of the microprogram will cause the shift registers 2-26, 2-28, 2-29 and 2-30 to be enabled by signals PUSHNT+EN and POPNOT+EN, driver 2-44 to be enabled by signal STKPOP−EN, and driver 2-46 to be disabled by signal INCRHS−EN.

The address of the next microword of the interrupted microprogram is read from shift registers 2-26, 2-28, 2-29 and 2-30. Output signals STKO 08+00 through STKO 11+00 are applied to ROM 2-2 via driver 2-44, signals RDRH08+00 through RDRH11+00, and MUX 2-22.

FIG. 5 shows the logic for the least significant four of the twelve address signals of ROM 2-2. It should be obvious to one of ordinary skill in the art to complete the logic to show the full 12 address bits.

Figure 6:
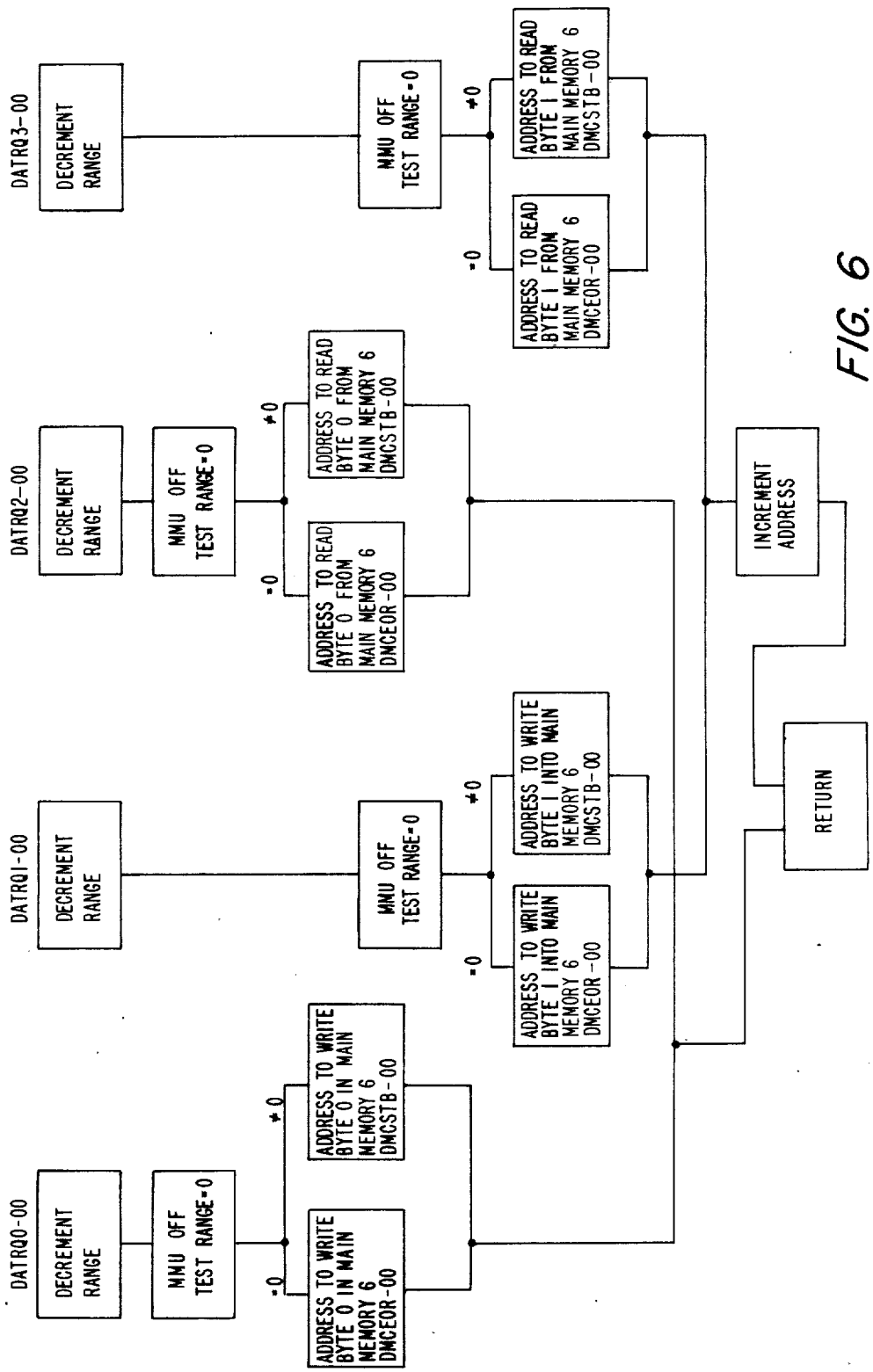
FIG. 6 is a firmware flow diagram of range and address processing in the CPU.

FIG. 6 is a flow diagram of the firmware blocks of the microprogram stored in ROM 2-2 which processes the read and write left byte and write byte operations.

As shown in FIG. 6, the data request signals DATRQ0−00 through DATRQ3−00 each interrupt the CPU 2 and each calls for a microprogram at a ROM 2-2 address specified by signals IPRSA1+00, IPRSA2+00 and IPRSA4+00 from encoder 2-20.

The microprogram addressed by signal DATRQ0−00 calls for writing byte 0 (the left byte or high order byte) into main memory 6. The first microword block decrements the range stored in CPU 2 register 2-4 of FIG. 1.

The next block turns the main memory unit (MMU) portion of the CPU 2 off and tests if the range is equal to ZERO. The MMU generates a real address from a virtual address. The real address was generated prior to the interrupt. If the MMU was not turned off, a new real address would be generated by this microword.

In the next block the address is sent out on CPU address bus 8 to write the data byte 0 received from floppy disk controller 38 or disk drive 52-2 over data bus 14 and data bus 16 into main memory 6. If the range was not equal to ZERO, the DMC cycle signal DMCCYC+00 establishes the DMC cycle. If the range was not equal to ZERO, then the end-of-range signal DMCEOR+00 establishes the last DMC cycle for this block of information.

The CPU 2 then returns to executing the interrupted microprogram.

Data request signal DATRQ1−00 results in a microprogram which writes data byte 1 (the left byte or low order byte) into main memory 6.

The steps of the microprogram are the same as in writing data byte ZERO except that the address is incremented and the CPU 2 returns to execute the interrupted microprogram. Remember that main memory 6 stores two data bytes in each address location.

Data request signals DATRQ2−00 and DATRQ3−00 call for microprograms which read byte 0 and byte 1, respectively, for transfer over data bus 16 and data bus 14 to either the floppy disk controller 38 or the disk drive 52-2. As before the microprogram reading data byte 1 increments the address before returning to the interrupted microprogram.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A microprogrammed data processing system includes a central processing unit (CPU), a main memory for storing a plurality of data bytes in each addressed location, and a plurality of mass storage controllers, all coupled in common to a system bus for transferring a block of data bytes between said main memory and said plurality of mass storage controllers over said system bus during data multiplex control (DMC) cycles, and a read only memory for storing a plurality of microprograms, said system further including apparatus for indicating to said CPU which of said plurality of data bytes in said addressed location in said main memory is to be accessed and whether a memory read or a memory write operation is to be performed, said apparatus comprising:

first means for generating a request signal when one of said plurality of mass storage controllers requires a data byte from said main memory or has a data byte to send to said main memory;

input/output random access memory (I/O RAM) means for storing input/output instruction information including channel number signals for identifying one of said plurality of mass storage controllers;

I/O microprocessor means for generating a plurality of I/O address signals, said I/O RAM means having means responsive to said plurality of I/O address signals for reading out onto said system bus said channel number signals;

second means in a mass storage controller coupled to receive said channel number signals on said system bus to generate a read/write signal in a first state indicating a main memory read operation and said read/write signal in a second state indicating a main memory write operation;

third means for generating a first signal on alternate DMC cycles indicating one of said plurality of data bytes in an addressed location;

fourth means coupled to said first means, said second means and said third means and responsive to said request signal, said read/write signal and said first signal for generating a plurality of data request signals; and fifth means, included in said CPU, and responsive to said plurality of data request signals for generating a plurality of address signals;

said read only memory coupled to said fifth means and having means responsive to said plurality of address signals for reading out one of a plurality of microprograms for processing said data cycle byte in accordance with one of said plurality of data request signals.

2. The apparatus of claim 1 wherein said third means comprises:

sixth means coupled to said read only memory, said read only memory having means for reading out microword signals, said sixth means being responsive to said microword signals for generating a sequence of DMC cycle signals for defining the timing of said DMC cycles; and flip-flop means responsive to said DMC cycle signal for generating said first signal on alternate DMC cycle signals.

3. The apparatus of claim 2 wherein said fourth means comprises:

decoder means responsive to said request signal, said read/write signal and said first signal for generating said plurality of data request signals including a first data request signal indicating a write byte 0 operation;

a second data request signal indicating a write byte 1 operation;

a third data request signal indicating a read byte 0 operation; and a fourth data request signal indicating a read byte 1 operation.

4. The apparatus of claim 3 wherein said fifth means comprises:

seventh means responsive to said first data request signal of said one of said plurality of data request signals for generating a first plurality of address signals of said one of said plurality of address signals;

said seventh means being responsive to said second data request signal for generating a second plurality of address signals;

said seventh means being responsive to said third data request signal for generating a third plurality of address signals; and said seventh means being responsive to said fourth data request signal for generating a fourth pluarlity of address signals.

5. The apparatus of claim 4 wherein said read only memory includes eighth means responsive to said first plurality of address signals for reading out a first microword of a first microprogram of said one of said plurality of microprograms;

said read only memory further includes ninth means responsive to said first plurality of address signals for generating a first sequence of of address signals for reading out said first microprogram for writing byte 0 into said main memory.

6. The apparatus of claim 4 wherein said read only memory includes eighth means responsive to said second plurality of address signals for reading out a second microword of a second microprogram of said one of said plurality of microprograms;

said read only memory further includes ninth means responsive to said second plurality of address signals for generating a second sequence of address signals for reading out said second mircroprogram for writing byte 1 into said main memory.

7. The apparatus of claim 4 wherein said read only memory includes eighth means responsive to said third plurality of address signals for reading out a third microword of a third microprogram of said one of said plurality of microprograms;

said read only memory further includes ninth means responsive to said third plurality of address signals for generating a third sequence of address signals for reading out said third microprogram for reading byte 0 into said main memory.

8. The apparatus of claim 4 wherein said read only memory includes eighth means responsive to said fourth plurality of address signals for reading out a fourth microword of a fourth microprogram of said one of said plurality of microprograms;

said read only memory further includes ninth means responsive to said foruth plurality of address signals for generating a fourth sequence of address signals for reading out said fourth microprogram for reading byte 1 into said main memory.

* * * * *